(12) United States Patent
Jensen

(10) Patent No.: US 10,670,130 B2
(45) Date of Patent: Jun. 2, 2020

(54) HARMONIC DRIVE APPARATUS

(71) Applicant: The Boeing Company, Chicago, IL (US)

(72) Inventor: Max Neal Jensen, Redmond, WA (US)

(73) Assignee: The Boeing Company, Chicago, IL (US)

( * ) Notice: Subject to any disclaimer, the term of this patent is extended or adjusted under 35 U.S.C. 154(b) by 623 days.

(21) Appl. No.: 15/351,875

(22) Filed: Nov. 15, 2016

(65) Prior Publication Data

US 2017/0059026 A1   Mar. 2, 2017

Related U.S. Application Data

(62) Division of application No. 14/457,196, filed on Aug. 12, 2014, now Pat. No. 9,494,223.

(51) Int. Cl.
*F16H 49/00*   (2006.01)

(52) U.S. Cl.
CPC ..... *F16H 49/001* (2013.01); *F16H 2049/003* (2013.01); *F16H 2049/006* (2013.01)

(58) Field of Classification Search
CPC .......................... F16H 49/001; F16H 2049/003
USPC .......................................................... 74/640
See application file for complete search history.

(56) References Cited

U.S. PATENT DOCUMENTS

| | | | |
|---|---|---|---|
| 2,906,143 A | 9/1959 | Musser | |
| 3,187,605 A | 6/1965 | Stiff | |
| 3,525,890 A | 8/1970 | Buchanan | |
| 3,532,005 A * | 10/1970 | Carpenter | F16H 49/001 475/163 |
| 3,604,287 A * | 9/1971 | Humphreys | F16H 13/00 74/640 |
| 3,977,275 A * | 8/1976 | Keisewetter | F16H 49/001 475/163 |
| 4,646,587 A * | 3/1987 | Danel | F16H 49/001 475/163 |
| 4,742,729 A * | 5/1988 | Cordara | F16H 49/001 475/159 |

FOREIGN PATENT DOCUMENTS

| | | |
|---|---|---|
| JP | 2011-2084 | 1/2011 |
| JP | 2011002084 | 1/2011 |

OTHER PUBLICATIONS

International Search Report and Written Opinion issued in co-pending PCT Application No. PCT/US2015/027711, filed Apr. 27, 2015.
International Preliminary Report on Patentability dated Feb. 23, 2017 in co-pending PCT Patent Application No. PCT/US2015/027711.

* cited by examiner

*Primary Examiner* — Ha Dinh Ho
(74) *Attorney, Agent, or Firm* — Joseph M. Rolnicki; Evans & Dixon, L.L.C.

(57) ABSTRACT

A harmonic drive apparatus (also known as a strain wave gear) is constructed with a circular, flexible spline disc having a generally flat configuration or a slightly conical configuration.

20 Claims, 8 Drawing Sheets

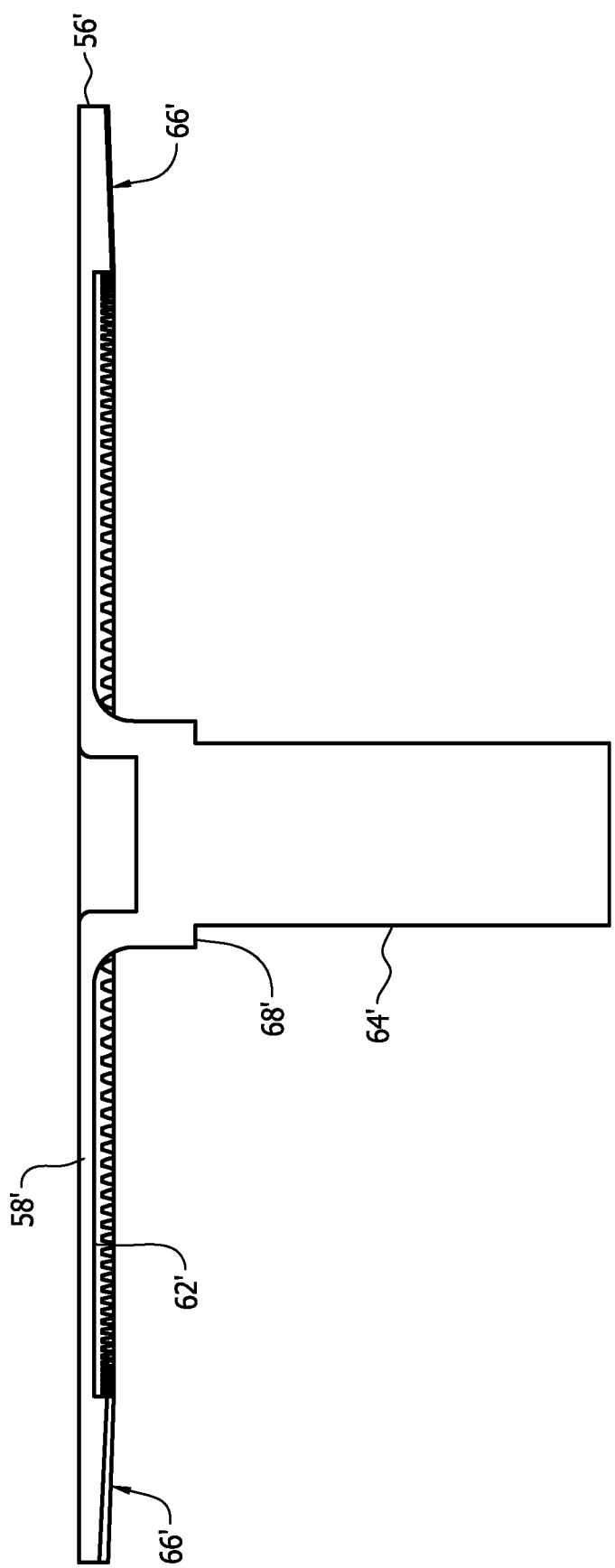

HARMONIC DRIVE APPARATUS

This application is a divisional application from application Ser. No. 14/457,196, which was filed on Aug. 12, 2014, and issued as U.S. Pat. No. 9,494,223 on Nov. 15, 2016.

FIELD

The present disclosure relates generally to a harmonic drive apparatus, also known as a strain wave gear. In particular, the present disclosure relates to a harmonic drive apparatus having a flexible spline with a conical configuration.

BACKGROUND

Harmonic drive apparatus are generally cylindrical speed reduction transmissions that can drastically reduce the speed of an input shaft transmitted to an output shaft with little or no backlash. Harmonic drive apparatus can be contained in small housings and are used extensively in applications where size and backlash are critical, such as in robotics. Harmonic drive apparatus were first introduced around 1957.

The typical construction of a harmonic drive apparatus comprises a cylindrical flexible spline inside a cylindrical fixed spline. A plurality of flexible, parallel gear teeth are provided on a cylindrical exterior surface of the flexible spline. A further plurality of parallel, rigid gear teeth are provided on a cylindrical interior surface of the fixed spline. The fixed spline gear teeth project inwardly toward the flexible spline gear teeth. The number of fixed spline gear teeth is larger than the number of flexible spline gear teeth.

An output shaft of the harmonic drive apparatus is connected to the flexible spline.

An input shaft of the harmonic drive apparatus is connected to a wave generator having an elliptical exterior surface. The wave generator elliptical exterior surface is positioned inside the flexible spline. The elliptical surface is positioned in a same plane as the flexible spline gear teeth and the fixed spline gear teeth. The elliptical surface engages an interior surface of the flexible spline at two 180 degrees spaced locations on the elliptical surface and pushes the flexible spline teeth into engagement with the fixed spline teeth. On rotation of the input shaft and rotation of the elliptical surface, the gear teeth on the flexible spline 180 degrees apart are pushed into engagement with the gear teeth of the fixed spline and the engagement between the gear teeth causes rotation of the flexible spline and the output shaft.

Even though harmonic drive apparatus are typically smaller than other gear reduction transmissions, there may be situations where even more compact, thinner packaging would be desirable. Thus, there is a need for an alternative packaging envelope of a harmonic drive apparatus where thinness or compactness is desirable.

SUMMARY

The harmonic drive apparatus (also known as a strain wave gear) of this disclosure includes a conical or flat flexible spline disc. The flexible spline disc enables the apparatus to provide an even thinner or even more compact packaging when needed for unique space requirements of a speed reduction transmission.

The harmonic drive apparatus includes an input shaft having a center axis that defines mutually perpendicular axial and radial directions, and an output shaft that is coaxial with the input shaft.

The apparatus also includes a wave generator disc that has axially opposing first and second circular surfaces that are coaxial with the center axis. The wave generator disc first surface is connected to the input shaft, whereby rotation of the input shaft rotates the wave generator disc. The wave generator disc second surface is a saddle shaped wave surface. The wave surface rotates around the center axis and has a sequential wave pattern of a crest that projects axially from the wave generator disc, then a trough that is axially recessed into the wave generator disc, then another crest that projects axially from the wave generator disc and then another trough that is axially recessed into the wave generator disc. The pair of crests project axially from the wave generator disc on radially opposite sides of the center axis and the pair of troughs are recessed axially into the wave generator disc on radially opposite sides of the center axis.

A plurality of roller bearings are arranged circumferentially around the center axis. The plurality of roller bearings are configured in rolling engagement with the wave generator disc wave surface.

A conical or flat, flexible spline disc is positioned on the axially opposite side of the roller bearings from the wave generator disc wave surface. The flexible spline disc has axially opposing first and second circular surfaces that are coaxial with the center axis. When the flexible spline disc has a conical configuration, the flexible spline first surface is generally concave and the flexible spline second surface is generally convex. The flexible spline first surface engages in rolling contact with the plurality of roller bearings. The flexible spline second surface is connected to the output shaft. The flexible spline second surface also has a plurality of radial, flexible gear teeth that are arranged around the center axis on the flexible spline second surface.

A rigid, fixed spline disc is positioned axially adjacent the flexible spline. The fixed spline has axially opposing first and second surfaces that are coaxial with the center axis. The fixed spline first surface has a plurality of radial, rigid gear teeth arranged circumferentially around the center axis on the first surface. The plurality of rigid gear teeth axially oppose the plurality of radial, flexible gear teeth on the flexible spline.

The pair of crests on the wave generator disc push a first and a second group of the flexible gear teeth on the flexible spline disc axially into engagement with a first and a second group of the rigid gear teeth on the fixed spline disc. The pair of troughs on the wave generator disc allow a third and a fourth group of the flexible gear teeth on the flexible spline disc to move axially away from and out of engagement with a third and a fourth group of rigid gear teeth on the fixed spline disc.

A housing encloses the wave generator disc, the plurality of roller bearings, the flexible spline disc and the fixed spline disc. The input shaft and the output shaft extend from axially opposite ends of the housing.

On rotation of the input shaft, the wave surface on the wave generator disc is rotated around the center axis and the pair of crests axially push the flexible spline and the first and second groups of gear teeth on the flexible spline into engagement with the first and second groups of rigid gear teeth on the fixed spline. The engaging groups of teeth rotate around the center axis in response to rotation of the input shaft and produce rotation of the flexible spline and the output shaft at a substantially reduced rate of rotation.

The features, functions, and advantages that have been discussed can be achieved independently in various embodiments or may be combined in other embodiments, further details of which can be seen with reference to the following description and drawings.

BRIEF DESCRIPTION OF THE DRAWINGS

FIG. 8 is a representation of a cross-section view of a further embodiment of the flexible spline of the apparatus.

DETAILED DESCRIPTION

Figure 1:
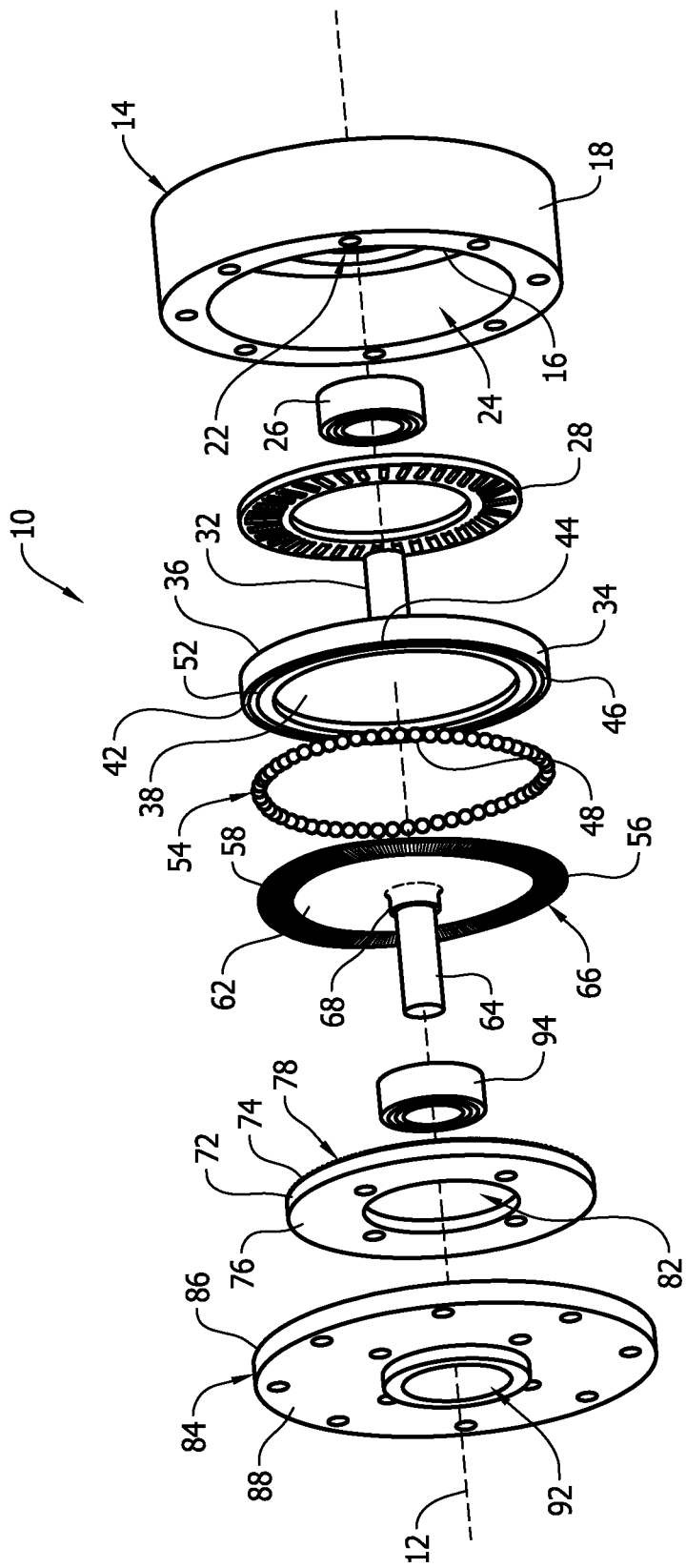
FIG. 1 is a representation of a perspective view of the disassembled component parts of the harmonic drive apparatus from the left of the apparatus.
Figure 2:
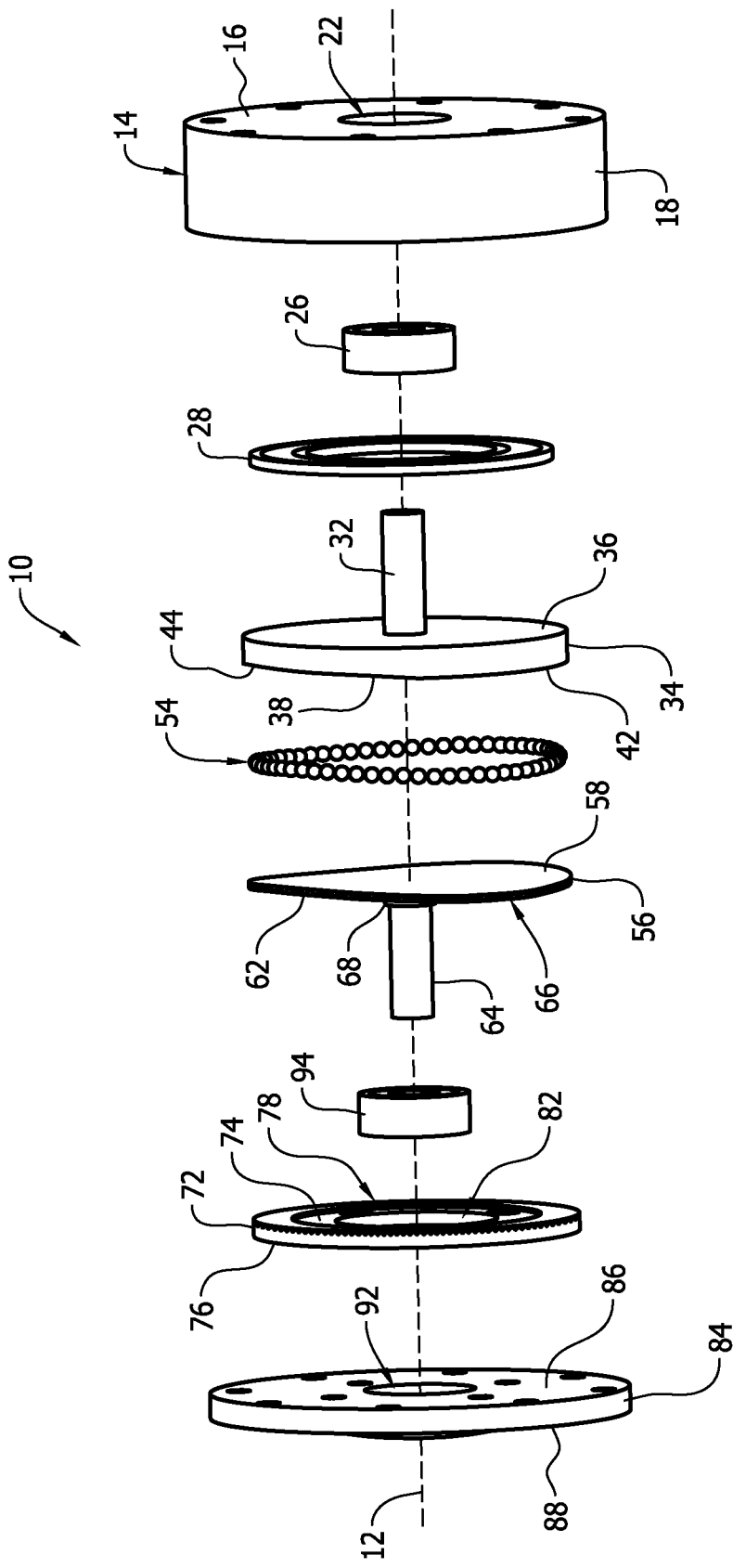
FIG. 2 is a representation of a perspective view of the component parts of the apparatus from the right of the apparatus.

FIGS. 1 and 2 show representations of the component parts of the harmonic drive apparatus 10 (also known as a strain wave gear) of this disclosure with the component parts being disassembled to better show the relative relationship of the parts. The parts are arranged coaxially along a center axis 12 of the apparatus in the sequential positions represented in FIGS. 1 and 2. The parts of the apparatus 10 can be constructed of any materials typically employed in constructing the component parts of a speed reduction transmission.

The apparatus 10 includes a first housing piece 14 having a circular end wall 16 and a cylindrical side wall 18 that extends axially from the outer periphery of the end wall 16. A small circular opening 22 is provided through the housing end wall 16. The opening 22 is coaxial with the center axis 12. The cylindrical side wall 18 surrounds a larger opening 24 into the interior of the first housing piece 14. A conventional cylindrical bearing assembly 26, for example a cylindrical roller bearing is press fit into the end wall opening 22. A conventional thrust bearing, for example a single roll thrust roller bearing 28 is inserted through the housing larger opening 24 and is positioned against the interior surface of the end wall 16.

An input shaft 32 of the apparatus extends through the center of the thrust roller bearing 28 and the cylindrical bearing 26. The cylindrical bearing 26 mounts the input shaft 32 for rotation relative to the apparatus 10 about the center axis 12.

Figure 3:
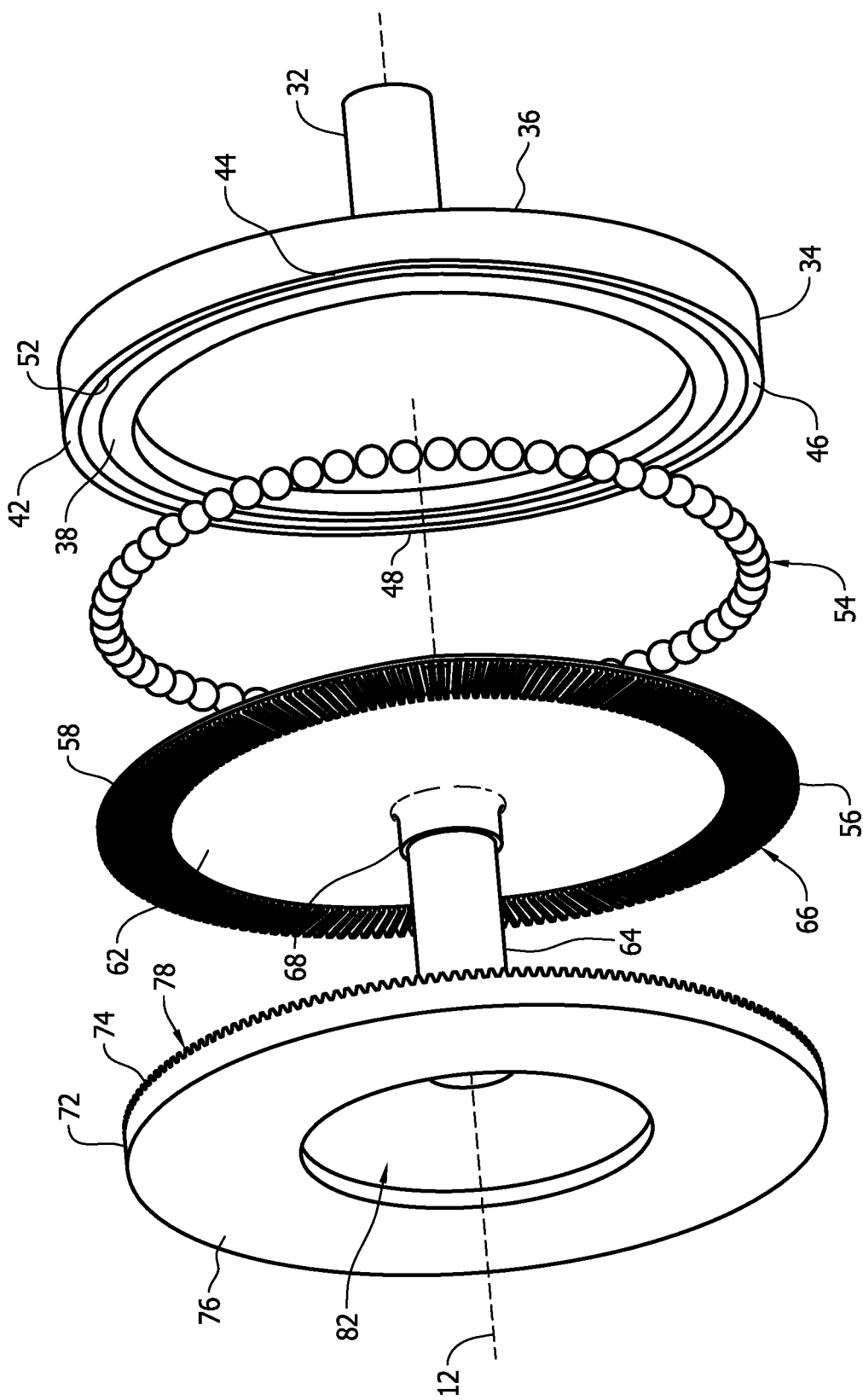
FIG. 3 is a representation of a perspective view similar to that of FIG. 1, but showing enlarged views of selected drive components of the apparatus.
Figure 7:
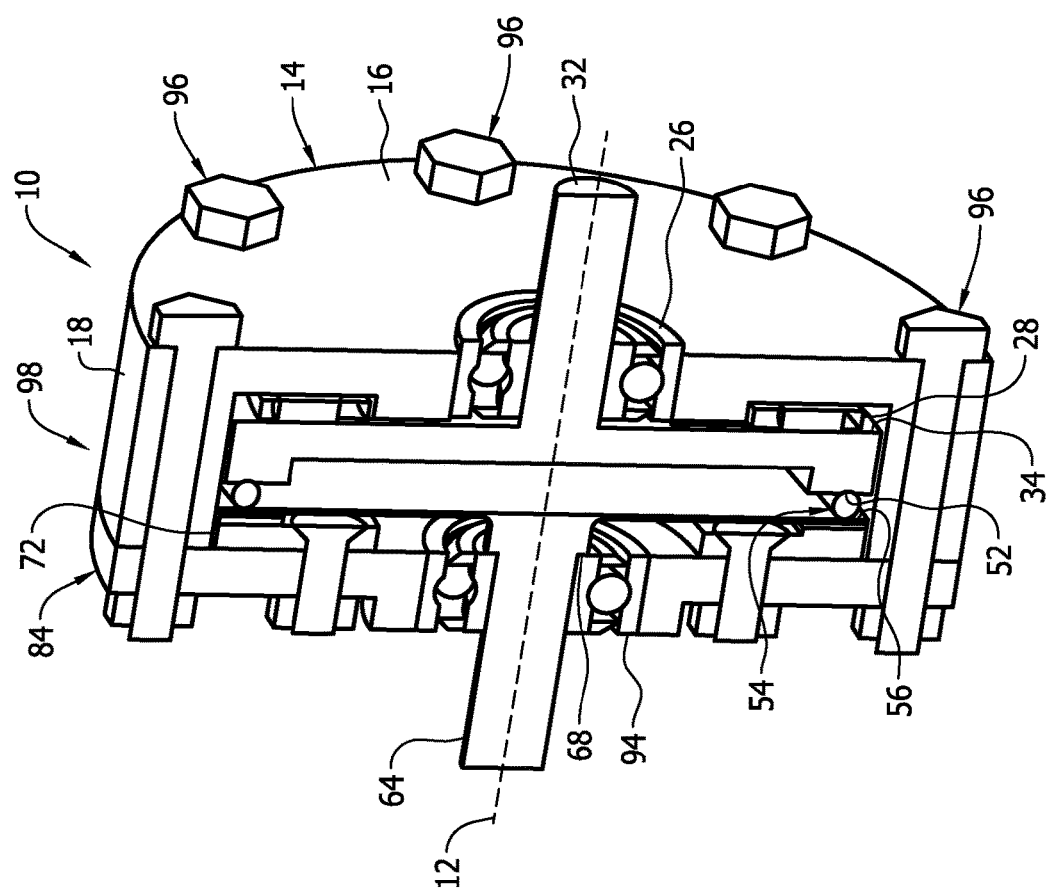
FIG. 7 is a representation of a cross-section perspective view of the apparatus.

A wave generator disc 34 is positioned in the first housing piece 14. The wave generator disc 34 has axially opposing first 36 and second 38 circular surfaces that are coaxial with the center axis 12. The wave generator disc first surface 36 is positioned in rolling engagement against the thrust roller bearing 28 as represented in FIG. 7. As represented in FIG. 2, the input shaft 32 is connected to the wave generator disc first circular surface 36, whereby rotation of the input shaft rotates the wave generator disc 34 in the first housing piece 14. Referring to FIGS. 1 and 3, the wave generator disc second circular surface 38 has the configuration of a saddle shaped wave surface. The wave surface circles around the center axis 12 and has a sequential wave pattern of a first crest 42 that projects axially from the wave generator disc 34, then a trough 44 that is axially recessed into the wave generator disc 34, then another crest 46 that projects axially from the wave generator disc 34 and then another trough 48 that is axially recessed into the wave generator disc 34. As represented in FIGS. 1 and 3, the pair of crests 42, 46 project axially from the wave generator disc 34 on radially opposite sides of the center axis 12 and the pair of troughs 44, 48 are recessed axially into the wave generator disc 34 on radially opposite sides of the center axis 12. Also represented in FIGS. 1 and 3 is a circular bearing groove 52 formed in the wave generator disc second circular surface 38 adjacent the outer periphery of the second circular surface 38.

As represented in FIGS. 1, 3 and 7, a plurality of bearings 54 are positioned in the circular bearing groove 52 in the wave generator disc second circular surface 38. In the representation of the apparatus in FIGS. 1, 3 and 7, the plurality of bearings 54 are separate spherical ball bearings. It should be understood that other equivalent types of bearings and bearing assemblies could be substituted for the ball bearings 54.

Figure 4:
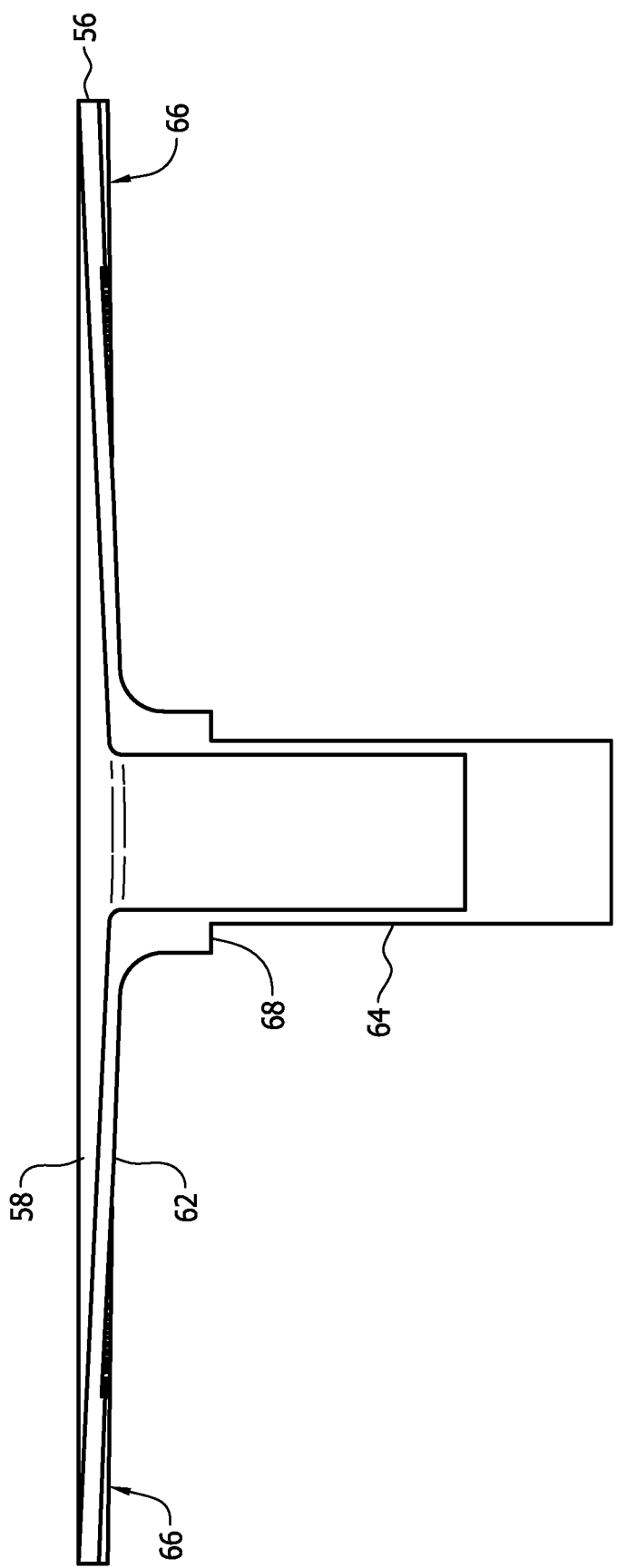
FIG. 4 is a representation of a cross-section view of the flexible spline of the apparatus.
Figure 5:
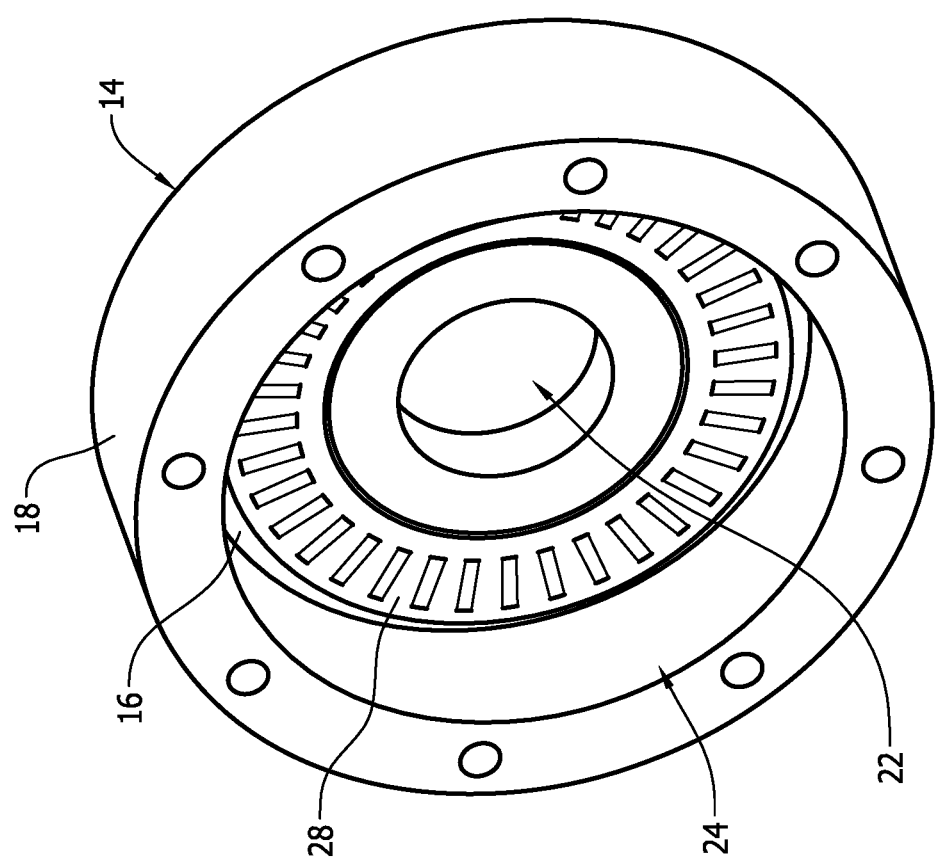
FIG. 5 is a representation of a perspective view of a right side housing piece shown in FIG. 1.

A flexible spline disc 56 is positioned on the axially opposite side of the ball bearings 54 from the wave generator disc second circular surface 38. The flexible spline disc 56 has axially opposed first 58 and second 62 circular surfaces that are coaxial with the center axis 12. In the embodiment of the apparatus 10 represented in the drawing figures, the flexible spline disc 56 has a conical configuration. Referring to the cross section of the flexible spline disc 56 represented in FIG. 4, the conical configuration gives the flexible spline disc first circular surface 58 a general concave configuration and gives the flexible spline disc second circular surface 62 a general convex configuration. In an alternate embodiment of the flexible spline disc 56 the disc is flat and the axially opposed first 58 and second 62 circular surfaces of the disc are flat. FIG. 8 shows a representation of the flat embodiment of the flexible spline disc 56'. In FIG. 8 the same reference numbers of FIG. 4 are used, with the reference numbers being followed by a prime ('). As represented in FIG. 7, the flexible spline disc first circular surface 58 engages in rolling contact with the plurality of ball bearings 54. The flexible spline disc second circular surface 62 is connected to an output shaft 64 of the apparatus 10. The flexible spline disc 56 and the output shaft 64 are coaxial with the center axis 12. The flexible spline disc second circular surface 62 also has a plurality of radial, flexible gear teeth 66 that are arranged circumferentially on the second circular surface 62 around the center axis 12 and adjacent the periphery of the disc. An annular lip 68 (shown in FIGS. 1 and 2) can be provided on the output shaft 64 to enable a bearing (to be described) to provide minimal, thrust pushing the flexible spline disc 56 against the wave generator disc 34.

A rigid, fixed spline disc 72 is positioned axially adjacent the flexible spline disc 56. The fixed spline disc 72 has axially opposed first 74 and second 76 circular surfaces that are coaxial with the center axis 12. The fixed spline disc first circular surface 74 has a plurality of radial, rigid gear teeth 78 arranged circumferentially around the center axis 12 on the first circular surface 74 adjacent the periphery of the first circular surface. The plurality of rigid gear teeth 78 axially oppose the plurality of flexible gear teeth 66 on the flexible spline disc 56. The fixed spline disc 72 has a center hole 82 through the disc that is coaxial with the center axis 12. With the fixed spline disc 72 positioned axially adjacent the flexible spline disc 56, the output shaft 64 extends coaxially through the fixed spline disc 72 center hole 82.

Figure 6:
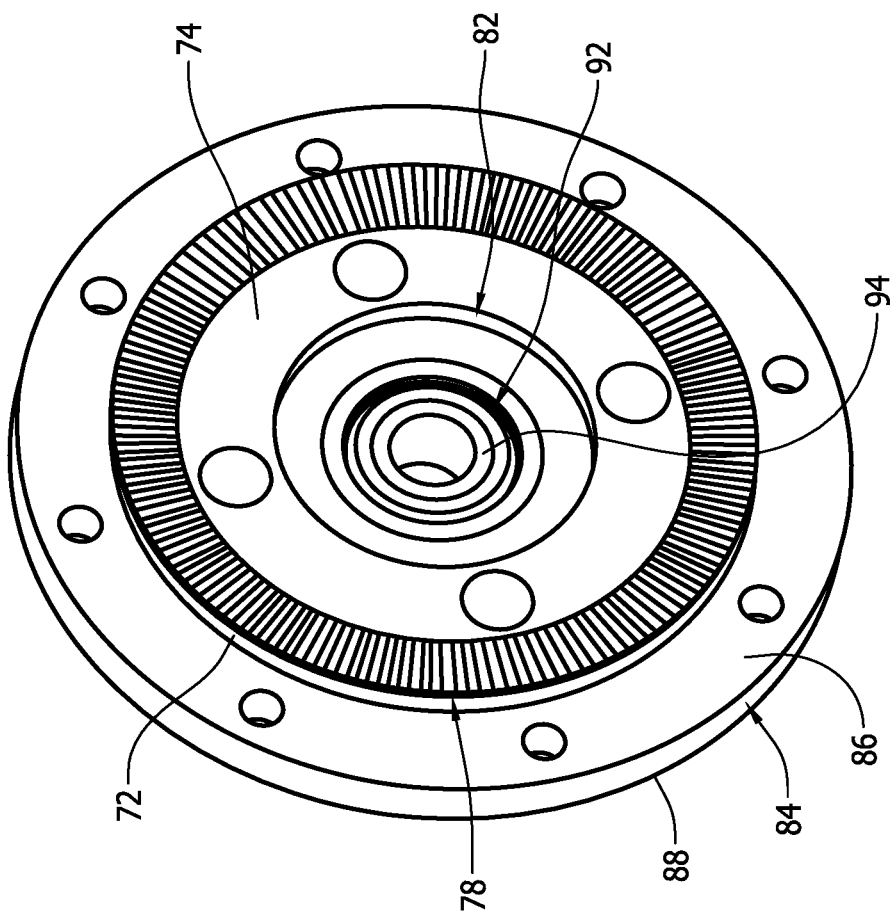
FIG. 6 is a representation of a perspective view of a left side housing piece shown in FIG. 1.

A second housing piece 84 is secured to the fixed spline disc second circular surface 62 and the cylindrical side wall 18 of the first housing piece 14. As represented in drawing FIGS. 1, 2 and 6, the second housing piece 84 is circular with opposing first 86 and second 88 surfaces that are coaxial with the center axis 12. The second housing piece 84 also has a center opening 92 that is circular and coaxial with the center axis 12. The second housing piece 84 center opening 92 is dimensioned to receive a second cylindrical bearing assembly 94 that is press fit in the opening 92. The second housing piece 84 first surface 86 is secured to the rigid, fixed spline disc 72, thereby fixing the fixed spline disc 72 stationary relative to the apparatus 10. A peripheral portion of the second housing piece 84 first surface 86 is also secured to the edge of the first housing piece 14 side wall 18 by a plurality of threaded fastener assemblies 96 as represented in FIG. 7. The output shaft 64 extends axially from the flexible spline disc 56, through the fixed spline disc 72 center hole 82 and the second cylindrical bearing assembly 94. Thus, the housing assembled from the first housing piece 14 and the second housing piece 84 encloses the thrust roller bearing 28, the wave generator disc 34, the plurality of ball bearings 54, the flexible spline disc 56 and the rigid, fixed spline disc 72 in an interior of the housing. The input shaft 32 and the output shaft 64 extend axially from opposite ends of the housing 98.

On rotation of the input shaft 32, the wave surface or second circular surface 38 of the wave generator disc 34 is rotated around the center axis 12 and the pair of crests 42, 46 axially push first and second groups of the ball bearings 54 on radially opposite sides of the center axis 12 into engagement with the flexible spline disc 56 first circular surface 58. Through the intermediary of the first and second groups of ball bearings 54, the pair of crests 42, 46 push the flexible spline disc 56 and first and second groups of radial, flexible gear teeth 66 on the flexible spline disc 56 on radially opposite sides of the center axis 12 into engagement with first and second groups of the radial, rigid gear teeth 78 on the rigid, fixed spline disc 72 on radially opposite sides of the center axis 12. The engaging groups of gear teeth on radially opposite sides of the center axis 12 rotate around the center axis 12 in response to rotation of the input shaft 32 around the center axis and produce rotation of the flexible spline disc 56 and the output shaft 64 at a substantially reduced rate of rotation.

The reduction ratio of the harmonic drive apparatus 10 is calculated in the same manner as a conventional harmonic drive apparatus. The reduction ratio is equal to the number of radial, flexible gear teeth 66 minus the number of radial, rigid gear teeth 78, divided by the number of radial, flexible gear teeth 66.

As various modifications could be made in the construction of the apparatus and its method of operation herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of reducing a rate of rotation from an input shaft to an output shaft and increasing torque from the input shaft to the output shaft, the method comprising:

connecting a flexible spline disc to the output shaft, providing the flexible spline disc with opposing first and second surfaces with a plurality of radial, flexible gear teeth on the second surface arranged circumferentially around the second surface of the flexible spline disc;

positioning a fixed, rigid spline disc adjacent the flexible spline disc with the rigid spline disc having a plurality of radial, rigid gear teeth arranged circumferentially around the rigid spline disc and opposed to the plurality of flexible gear teeth on the second surface of the flexible spline disc;

positioning a wave generator adjacent the flexible spline disc first surface with the wave generator having a wave surface with at least one projecting crest and at least one recessed trough arranged circumferentially around the wave surface; and connecting the wave generator to the input shaft and rotating the input shaft causing the at least one projecting crest on the wave surface to push the flexible spline disc first surface and push a group of the flexible gear teeth into engagement with a group of the rigid gear teeth and thereby causing rotation of the flexible spline disc and rotation of the output shaft at a reduced rate of rotation of the output shaft from the rate of rotation of the input shaft.

2. The method of claim 1, further comprising:

forming the first surface of the flexible spline disc as a concave surface and forming the second surface of the flexible spline disc as a convex surface.

3. A method of rotating an output shaft by rotating an input shaft, the method comprising:

rotating the input shaft around a center axis, the center axis defining mutually perpendicular axial and radial directions;

rotating a wave generator around the center axis in response to the input shaft rotating around the center axis, the wave generator having a wave surface with at least one axially projecting crest and at least one axially recessed trough that rotate around the center axis;

pushing the axially projecting crest of the wave generator into a concave surface of a flexible spline disc, the flexible spline disc having a convex surface on an opposite side of the flexible spline disc from the concave surface with a plurality of flexible gear teeth arranged circumferentially on the convex surface extending completely around the center axis; and, pushing a group of the flexible gear teeth on the convex surface of the flexible spline disc into an adjacent rigid spline disc having a group of rigid gear teeth and causing rotation of an output shaft on the flexible spline disc in response to the pushing of the axially projecting crest of the wave generator into the concave surface of the flexible spline disc.

4. The method of claim 3, further comprising:

pushing sequential groups of the flexible gear teeth on the convex surface of the flexible spline disc into the group of rigid gear teeth by pushing a sequential wave pattern of axially projecting crests and axially recessed troughs on the wave surface of the wave generator into the concave surface of the flexible spline disc.

5. The method of claim 3, further comprising:

axially pushing a plurality of roller bearings engaged between the concave surface of the flexible spline disc and the wave surface of the wave generator into the concave surface of the flexible spline disc in response to the rotation of the wave generator.

6. The method of claim 3, further comprising:
enclosing the wave generator, the flexible spline disc and the group of rigid gear teeth in a housing with the input shaft and the output shaft extending in axially opposite directions from the housing.

7. The method of claim 3, further comprising:
holding the group of rigid gear teeth stationary relative to the input shaft while rotating the input shaft.

8. The method of claim 3, further comprising:
rotating the input shaft at a first rate of rotation around the center axis; and,
rotating the output shaft at a second rate of rotation around the center axis in response to rotating the input shaft at the first rate of rotation around the center axis, the second rate of rotation being less than the first rate of rotation.

9. The method of claim 3, further comprising:
exerting an axially directed thrust force on one side of the wave generator that is opposite the wave surface, the axially directed thrust force causing the axially projecting crest on the wave generator to push into the concave surface of the flexible spline disc.

10. The method of claim 3, further comprising:
positioning the group of rigid gear teeth in a circular configuration and in a single plane.

11. The method of claim 3, further comprising:
rotating the input shaft at a first torque around the center axis; and,
rotating the output shaft at a second torque around the center axis, the second torque being larger than the first torque.

12. A method of reducing a rate of rotation from an input shaft to an output shaft and increasing torque from the input shaft to the output shaft, the method comprising:
rotating the input shaft around a center axis, the center axis defining mutually perpendicular axial and radial directions;
rotating a wave generator around the center axis in response to the input shaft rotating around the center axis, the wave generator having a wave surface that extends around the center axis, the wave surface having at least one wave surface crest that projects axially from the wave surface and at least one wave surface trough that extends axially into the wave surface;
pushing the at least one wave surface crest that projects axially from the wave surface into a flexible concave surface of a flexible spline disc, the flexible spline disc having a flexible convex surface on an opposite side of the flexible spline disc from the flexible concave surface with a plurality of radial, flexible gear teeth arranged circumferentially on the flexible convex surface extending completely around the center axis; and,
pushing a group of the radial, flexible gear teeth on the flexible convex surface of the flexible spline disc into engagement with an adjacent rigid spline disc having a group of radial, rigid gear teeth arranged circumferentially around the center axis and causing rotation of an output shaft operatively connected to the flexible spline disc in response to the pushing of the at least one wave surface crest that projects axially from the wave surface into the flexible concave surface of the flexible spline disc.

13. The method of claim 12, further comprising:
pushing sequential groups of the radial, flexible gear teeth on the flexible convex surface of the flexible spline disc into the group of radial, rigid gear teeth by pushing a sequential wave pattern of wave surface crests and wave surface troughs on the wave surface of the wave generator into the flexible concave surface of the flexible spline disc.

14. The method of claim 12, further comprising:
axially pushing a plurality of roller bearings engaged between the flexible concave surface of the flexible spline disc and the wave surface of the wave generator into the flexible concave surface of the flexible spline disc in response to the rotation of the wave generator.

15. The method of claim 12, further comprising:
enclosing the wave generator, the flexible spline disc and the group of radial, rigid gear teeth in a housing with the input shaft and the output shaft extending in axially opposite directions from the housing.

16. The method of claim 12, further comprising:
holding the group of radial, rigid gear teeth stationary relative to the input shaft while rotating the input shaft.

17. The method of claim 12, further comprising:
rotating the input shaft at a first rate of rotation around the center axis; and,
rotating the output shaft at a second rate of rotation around the center axis in response to rotating the input shaft at the first rate of rotation around the center axis, the second rate of rotation being less than the first rate of rotation.

18. The method of claim 12, further comprising:
exerting an axially directed thrust force on one side of the wave generator that is opposite the wave surface, the axially directed thrust force causing the at least one wave surface crest on the wave generator to push into the flexible concave surface of the flexible spline disc.

19. The method of claim 12, further comprising:
positioning the group of radial, rigid gear teeth in a circular configuration and in a single plane.

20. The method of claim 12, further comprising:
rotating the input shaft at a first torque around the center axis; and,
rotating the output shaft at a second torque around the center axis, the second torque being larger than the first torque.

* * * * *